United States Patent
Frahm et al.

(10) Patent No.: US 12,202,558 B2
(45) Date of Patent: Jan. 21, 2025

(54) POWER STEERING CONTROL SYSTEM

(71) Applicant: FCA US LLC, Auburn Hills, MI (US)

(72) Inventors: Patrick L Frahm, Madison Heights, MI (US); Prathmesh S Jambhale, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 111 days.

(21) Appl. No.: 18/069,641

(22) Filed: Dec. 21, 2022

(65) Prior Publication Data

US 2024/0208568 A1   Jun. 27, 2024

(51) Int. Cl.
*B62D 6/00* (2006.01)
*B62D 5/04* (2006.01)
*B62D 5/065* (2006.01)
*B62D 6/02* (2006.01)

(52) U.S. Cl.
CPC .......... *B62D 6/001* (2013.01); *B62D 5/0463* (2013.01); *B62D 5/0481* (2013.01); *B62D 5/065* (2013.01); *B62D 6/02* (2013.01)

(58) Field of Classification Search
None
See application file for complete search history.

(56) References Cited

U.S. PATENT DOCUMENTS

| | | | | |
|---|---|---|---|---|
| 6,069,460 A | * | 5/2000 | Grabowski | B62D 5/065 318/434 |
| 7,971,679 B2 | * | 7/2011 | Haupt | B62D 6/00 180/441 |
| 8,428,823 B2 | * | 4/2013 | Saito | B62D 12/00 701/41 |
| 9,126,627 B2 | * | 9/2015 | Plaideau | B62D 15/021 |
| 9,821,836 B2 | * | 11/2017 | Itamoto | B62D 5/0484 |
| 9,862,411 B2 | * | 1/2018 | Birsching | B62D 5/06 |
| 11,180,191 B2 | * | 11/2021 | Xu | B62D 6/04 |
| 2009/0065286 A1 | * | 3/2009 | Haupt | B62D 5/0835 180/443 |
| 2011/0029199 A1 | * | 2/2011 | Saito | B62D 12/00 701/41 |
| 2016/0075370 A1 | * | 3/2016 | Itamoto | B62D 5/0466 701/41 |

(Continued)

FOREIGN PATENT DOCUMENTS

| | | | | | |
|---|---|---|---|---|---|
| CN | 102015417 A | * | 4/2011 | ............ | B62D 12/00 |
| CN | 102256862 B | * | 8/2014 | ............ | B62D 15/021 |
| CN | 107848565 A | * | 3/2018 | ............ | B60W 10/20 |

(Continued)

*Primary Examiner* — Kevin R Steckbauer
(74) *Attorney, Agent, or Firm* — Jeremy J. Klobucar

(57) ABSTRACT

In at least some implementations, a method of controlling assist in a power steering system, includes determining a rate of movement of a steering input over a period of time, determining a rate of vehicle speed over the period of time, and controlling an electric power steering assist actuator as a function of one or both of the rate of movement of the steering input and the rate of vehicle speed. The rate of movement of the steering input is determined using a higher number of output signals from a steering angle sensor when one or both of the rate of vehicle speed is lower and the rate of movement of the steering input is lower, than when one or both of the rate of vehicle speed is greater and the rate of movement of the steering input is greater.

17 Claims, 1 Drawing Sheet

(56) References Cited

U.S. PATENT DOCUMENTS

2021/0221430 A1\* 7/2021 Mannava ............. B62D 5/0472

FOREIGN PATENT DOCUMENTS

| | | | | | |
|---|---|---|---|---|---|
| CN | 109696120 | A | \* | 4/2019 | ............... G01B 7/30 |
| CN | 109533011 | B | \* | 7/2020 | ............... B60Q 9/00 |
| CN | 109696120 | B | \* | 10/2020 | ............... G01B 7/30 |
| CN | 117962865 | A | \* | 5/2024 | |
| DE | 112015001287 | T5 | \* | 1/2017 | ............ B62D 5/046 |
| EP | 2269894 | B1 | \* | 1/2013 | ............. B62D 12/00 |
| EP | 2379397 | B1 | \* | 3/2014 | ........... B62D 15/021 |
| EP | 2998198 | A1 | \* | 3/2016 | ........... B62D 5/0409 |
| EP | 2998198 | B1 | \* | 2/2017 | ........... B62D 5/0409 |
| JP | 2001324321 | A | \* | 11/2001 | ......... B62D 15/0215 |
| JP | 2004239737 | A | \* | 8/2004 | |
| JP | 2007278776 | A | \* | 10/2007 | |
| JP | 5576396 | B2 | \* | 8/2014 | ........... B62D 15/021 |
| JP | 2016060299 | A | \* | 4/2016 | ........... B62D 5/0409 |

\* cited by examiner

POWER STEERING CONTROL SYSTEM

FIELD

The present disclosure relates to a power steering control system.

BACKGROUND

Some vehicles include power steering systems that assist movement of a steering wheel to reduce the effort needed manually turn the steering wheel. Steering angle sensors used to determine an instantaneous steering wheel rotary position have some degree of error and some lag time in providing a signal to a controller. These errors can cause a power steering actuator to be overdriven or underdriven, or driven in an intermittent or step-wise way with different levels of assist provided in such steps or intermittent way. Among other issues, this inconsistent or intermittent driving of the power steering system is noticeable to a driver and negatively affects the steering feel and other aspects of the driving experience.

SUMMARY

In at least some implementations, a method of controlling assist in a power steering system, includes determining a rate of movement of a steering input over a period of time, determining a rate of vehicle speed over the period of time, and controlling an electric power steering assist actuator as a function of one or both of the rate of movement of the steering input and the rate of vehicle speed. The rate of movement of the steering input is determined using a higher number of output signals from a steering angle sensor when one or both of the rate of vehicle speed is lower and the rate of movement of the steering input is lower, than when one or both of the rate of vehicle speed is greater and the rate of movement of the steering input is greater.

In at least some implementations, the rate of movement of the steering input is determined with a sensor having an output cycle between two (2) milliseconds and thirty (30) milliseconds and wherein multiple outputs from the sensor are used to determine the rate of movement of the steering input. In at least some implementations, the rate of movement of the steering input is determined with a smoothing method that is different when the rate of vehicle speed is lower and when the rate of movement of the steering input is lower, than when the rate of vehicle speed is higher and when the rate of movement of the steering input is higher. In at least some implementations, the number of sensor responses used to determine the rate of movement of the steering input at a given vehicle speed and a given rate of movement of the steering input is determined with a smoothing method includes exponential or linear decay or step function smoothing. In at least some implementations, the number of sensor responses used to determine the rate of movement of the steering input at a given vehicle speed and a given rate of movement of the steering input is determined with a stored data set.

In at least some implementations, the electric power steering assist actuator is a pump that pumps hydraulic fluid and the pump is operated to control the level of steering assist provided. In at least some implementations, the electric power steering assist actuator is an electric motor that directly provides steering assist to reduce the effort needed to manually move the steering input. In at least some implementations, the electric motor may provide all steering power and a separate electric motor may be provided to provide feedback to the driver.

In at least some implementations, a method of controlling assist in a power steering system, includes determining a rate of movement of a steering input over a period of time, determining a rate of vehicle speed over the period of time and actuating a power steering assist actuator that assists movement of the steering input so that the steering input may be moved with less manual effort. Actuation of the power steering assist actuator varies as a function of one or both of the rate of movement of the steering input and the rate of vehicle speed, and the period of time is longer when the rate of vehicle speed is lower and when the rate of movement of the steering input is lower, and the period of time is shorter when the rate of vehicle speed is higher and when the rate of movement of the steering input is higher.

In at least some implementations, the period of time relates to a selected number of consecutive outputs from a steering angle sensor, where inclusion of more outputs results in a longer period of time than does inclusion of fewer outputs. In at least some implementations, the rate of movement of the steering input is determined with a sensor having an output cycle between two (2) milliseconds and thirty (30) milliseconds and wherein multiple outputs from the sensor are used to determine the rate of movement of the steering input.

In at least some implementations, the rate of movement of the steering input is determined with multiple outputs from a steering angle sensor using a smoothing method that is different when one or both of the rate of vehicle speed is lower and the rate of movement of the steering input is lower, than when one or both of the rate of vehicle speed is higher and the rate of movement of the steering input is higher. In at least some implementations, the number of sensor responses used to determine the rate of movement of the steering input at a given vehicle speed and/or a given rate of movement of the steering input is determined with a smoothing method includes exponential or linear decay or step function smoothing. In at least some implementations, the number of sensor responses used to determine the rate of movement of the steering input at a given vehicle speed and/or a given rate of movement of the steering input is determined with a stored data set.

In at least some implementations, the electric power steering assist actuator is a pump that pumps hydraulic fluid and the pump is operated to control the level of steering assist provided. In at least some implementations, the electric power steering assist actuator is an electric motor that directly provides steering assist to reduce the effort needed to manually move the steering input.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
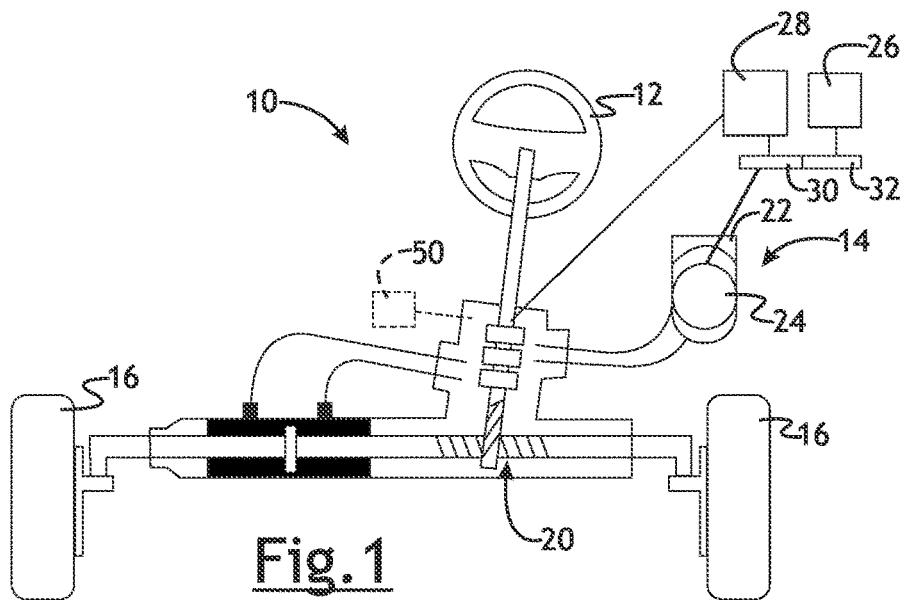
FIG. 1 is a diagrammatic view of a power steering system for a vehicle.

Referring in more detail to the drawings, FIG. 1 illustrates a vehicle steering system 10 having a steering input 12 by which a driver can steer the vehicle, and a power assist assembly 14 that enables the steering input 12 to be moved by the driver with less effort. In at least some implementations, the steering input 12 is a steering wheel 12 that control the angles of vehicle wheels 16 through a linkage that may include a rack and pinion assembly 20. In at least some implementation, the power assist assembly 14 includes a supply of hydraulic fluid 22 and an electric motor driven pump 24 that pumps the hydraulic fluid.

The system 10 further includes a vehicle speed sensor 26 and a steering angle sensor 28 that are communicated with a controller 30 programmed to control operation of the pump 24 to provide a desired level of steering assist. The vehicle speed sensor 26 may be any desired type of sensor such as those commonly used in automotive vehicles. The steering angle sensor 28 may be a digital sensor having a response loop or cycle time of at least two (2) milliseconds, and in at least some implementations, between two (2) and thirty (30) milliseconds.

The output to the pump 24 from the controller 30 may be determined by a processor of the controller 30 as a function of the input(s) received by the controller 30. The controller 30 may include or be communicated with a memory 32 that can store instructions for valve operation. Various microcontrollers or microprocessors may be used as is known to those skilled in the art. The memory 32 may be of any desired type, such as a reprogrammable or flash EEPROM (electrically erasable, programmable read-only memory). The memory 32 should be construed broadly to include other types of memory such as RAM (random access memory), ROM (read-only memory), EPROM (erasable, programmable, read-only memory), or any other suitable non-transitory computer readable medium. The memory 32 may include stored of data which may include, for example, a map or lookup table, from which the controller 30 can determine an output as a function of the inputs to the controller 30. In this way, the control system for the pump 24 may be a closed loop system. In at least some implementations, an open loop system may be used.

In at least some implementations, a method of controlling assist in a power steering system 10 includes driving an actuator (e.g. pump 24) to provide power steering assist as a function of a rate of movement of the steering input 12 over a period of time, and a rate of vehicle speed over that period of time. The rate of movement of the steering input 12 and the vehicle speed may be a rate or speed determined as a function of associated rate of movement (e.g. of the steering input 12 or of the vehicle) in that period of time, such as an average rate or speed. In at least some implementations, the actuator is an electric motor pump 24 that pumps hydraulic steering fluid so that the steering input 12 may be moved with less manual effort, and the actuation of the pump 24 varies as a function of one or both of the rate of movement of the steering input 12 and the rate of vehicle speed. In at least some implementations, the period of time over which the rate of steering input movement is determined is longer when one or both of the rate of vehicle speed is lower and the rate of movement of the steering input 12 is lower, and the period of time is shorter when one or both of the rate of vehicle speed is higher and the rate of movement of the steering input 12 is higher.

That is, the determination of the rate of movement of the steering input 12 and the vehicle speed occurs over a longer period of time when the vehicle is moving slowly and/or the steering input 12 is moving more slowly. This enables a smoother input that utilizes more signals or a more accurate signal from the steering angle sensor 28 to reduce error in the determined rate of movement of the steering input 12. And this enables use of a lower resolution and hence, less expensive, sensor 28 to determine steering angle and rate of change of steering angle.

With a lower resolution sensor 28, each output may include a certain magnitude of error and attempting to drive the actuator 24 based upon the less accurate input to the controller 30 results in over or under driving the actuator and a "notchy" or "jerky" feel to the vehicle steering that is noticeable to the driver. That is, the signal-to-signal variability is higher in a lower resolution sensor and so driving the actuator 24 based on individual or a lower number of outputs from the sensor 28 results in inaccurate driving of the actuator. This is most noticeable at lower vehicle speeds and lower rates of turning of the steering wheel. Also, because the rates are lower, there is less need to change the steering assist rapidly in these operating conditions, so more signals may be used to determine rate of change of the steering wheel 12, without negatively impacting the steering assist provided or the desired responsiveness of the system. At higher vehicle speeds or higher rates of steering input 12 movement, faster system responses may be needed and the method accommodates that need by utilizing a shorter period in which the noted speeds/rates are determined and utilizing fewer outputs from, for example, the steering angle sensor 28.

In at least some implementations, the rate of steering input 12 movement may be determined based upon a function of the signals received during a period of time, where the period of time may be determined as a function of the number of signals received from the steering angle sensor 28, which is a function of a response or cycle time of the sensor (e.g. a minimum time between consecutive outputs/signals from the sensor). The average rate of movement of the steering input 12 may be an average of the rates of movement determined from the sensor outputs with a period of time, or the determined rate of movement may be determined based upon some other function of the sensor outputs. For example, a smoothing method may be used to normalize the sensor outputs and provide a more controlled actuation of the actuator to further reduce the notchy or step-wise feel of the steering assist. The smoothing function may use, for example, exponential or linear decay, or step function smoothing to provide a desired actuation of the steering assist actuator. The smoothing function may be different when the rate of vehicle speed is lower and/or the rate of movement of the steering input 12 is lower, than when the rate of vehicle speed is higher and/or the rate of movement of the steering input 12 is higher. For example, the number of sensor outputs or responses used in the smoothing function may be higher at lesser vehicle speeds and lower rates of steering input 12 movement, and lower at greater vehicle speeds and rates of movement of the steering input 12. A smooth or "stepped out" feature enables continuous transition from high accuracy/slow response (e.g. using a greater number of sensor signals in the determination of steering input movement, which occurs over a greater period of time and improves accuracy of the determination) to low accuracy/fast response (e.g. using fewer sensor signals in the determination of steering input movement, which occurs faster by may be less accurate). The smoothing may be implemented between 2 different calculated signals, with a first calculated signal being a faster response signal that uses fewer sensor outputs and the second calculated signal being a slow response/high accuracy signal that uses more sensor outputs.

The method may determine how many sensor responses (e.g. outputs from the steering angle sensor 28) are to be used in a determination of steering angle rate of movement as a function of both that rate of movement and vehicle speed, and may use an algorithm or a stored data set such as a map or lookup table. In this way, the number of sensor responses used to determine a rate of movement of the steering input 12 is variable to enable the steering system to have a desired responsiveness over a wide range of vehicle operating conditions. At very low vehicle speeds and lower rates of movement of the steering input 12, five or more sensor outputs may be used to determine the rate of movement of the steering input 12 over that period of time (e.g. the period in which the five or more sensor outputs occurred). In at least some implementations, at very high vehicle speeds and higher rates of steering input 12 movement, two sensor outputs are used. In intermediate situations, four and three sensor outputs may be used, to provide a variable responsiveness and a variable driving of the steering assist actuator. In at least some implementations, a low vehicle speed may be below 10 kph, and a low rate of steering input movement may be rotation at less than 25 degrees/second. Of course, other values may be used, as desired.

In at least some implementations, the steering angle sensor 28 is a digital or analog sensor and may have a resolution of 0.1 degree to fifty (50) degrees, and a signal-to-signal or response cycle time of between two milliseconds and thirty milliseconds. The digital sensor 28 may continuously provide discrete outputs to the controller 30, with the delay between consecutive outputs being directly correlated to the cycle time of the sensor outputs. Thus, the sensor 28 will provide a given number of discrete outputs for a given period of time, as a function of the sensor loop or cycle time.

Figure 2:
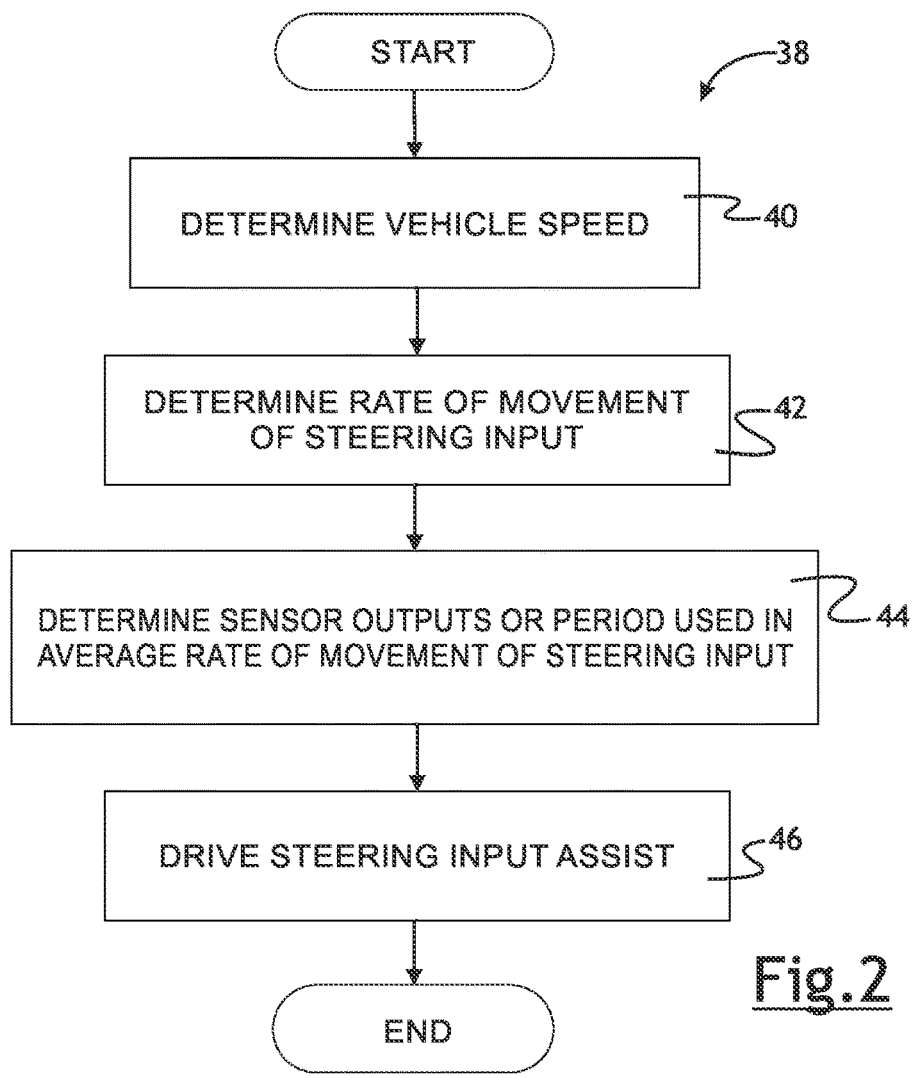
FIG. 2 is a flow chart for a method of controlling a power steering assist actuator.

FIG. 2 is a flowchart for a method 38 of controlling the pump 24 to provide a desired level of steering assist. The method 38 includes determining vehicle speed at step 40 and determining a rate of movement of the steering input 12 at step 42. The vehicle speed may be determined with a suitable sensor 26, and the rate of movement of the steering input 12 may be determined by comparison of two or more outputs from the steering angle sensor 28. These two values are then used in step 44 to determine how many steering angle sensor 28 outputs are to be used in a determination of rate of movement of the steering input 12, where the number of outputs may occur over a period of time. The determined rate of steering input 12 movement, along with the determined vehicle speed, is then used in step 46 to drive the steering assist actuator to provide steering assist as a function of one or both of the vehicle speed and the determined rate of change of the steering input 12. In at least some implementations, to determine how many sensor outputs to use in the averaging/smoothing calculation for rate of steering angle movement, the method/system may use 10 steering angle sensor output signals (for example, a running average of the last 10 signals may be used). Of course, other numbers of signals may be used, with at least some implementations using 3 or more signals (e.g. 3 and up to 20).

Other attempts to reduce the notchy, step-wise feel of a steering system may use a much more expensive steering angle sensor 28 with greater position accuracy, to provide improved accuracy and thus reduce the error in driving the steering assist actuator. But this undesirably adds significant cost the system.

The method described herein may also be used in an electric power steering system using an electric motor 50 (shown in dashed lines as an alternative in FIG. 1) to directly assist steering rather than pump 24 steering fluid to reduce steering effort. In such systems, play (e.g. relative movement) between a pinion and rack yoke may cause or contribute to a "clunk" or harsh engagement during certain steering maneuvers. The method may be used to improve the steering feel and/or NVH performance (Noise, Vibration and Harshness) during initial relative movement of steering components. Further, in an electric power steering system, the method described herein may permit use of a stiffer torsion bar in the steering system as error in the steering angle sensor 28 (or torque sensor as may be used in such steering systems) is muted or masked and so the electric steering assist can be provided more smoothly and enable a better steering feel even with a stiffer torsion bar that usually worsens the accuracy of the power steering assist.

What is claimed is:

1. A method of controlling assist in a power steering system, comprising:
    determining a rate of movement of a steering input over a period of time;
    determining a rate of vehicle speed over the period of time;
    controlling an electric power steering assist actuator as a function of one or one or both of the rate of movement of the steering input and the rate of vehicle speed, wherein the rate of movement of the steering input is determined using a digital steering angle sensor that has cycles with a response cycle time and that provides a discrete output each cycle, and wherein the period of time includes multiple cycles and a higher number of cycles are used when one or both the rate of vehicle speed is lower and the rate of movement of the steering input is lower, than when one or both of the rate of vehicle speed is greater and the rate of movement of the steering input is greater.

2. The method of claim 1 wherein the response cycle time is between 2 milliseconds and 30 milliseconds.

3. The method of claim 1 wherein the rate of movement of the steering input is determined with a smoothing method that is different when one or both of the rate of vehicle speed is lower and the rate of movement of the steering input is lower, than when one or both of the rate of vehicle speed is higher and the rate of movement of the steering input is higher.

4. The method of claim 1 wherein the number of cycles used to determine the rate of movement of the steering input at a given vehicle speed and/or a given rate of movement of the steering input is determined with a stored data set.

5. The method of claim 1 wherein the electric power steering assist actuator is a pump that pumps hydraulic fluid and the pump is operated to control the level of steering assist provided.

6. The method of claim 1 wherein the electric power steering assist actuator is an electric motor that directly provides steering assist to reduce the effort needed to manually move the steering input.

7. The method of claim 2 wherein the period of time includes a predetermined number of output cycles and the period of time is greater when one or both the rate of vehicle speed is lower and the rate of movement of the steering input is lower, than when one or both of the rate of vehicle speed is greater and the rate of movement of the steering input is greater.

8. The method of claim 1 wherein the number of cycles used to determine the rate of movement of the steering input at a given vehicle speed and a given rate of movement of the steering input is determined with a smoothing method includes exponential or linear decay or step function smoothing.

9. A method of controlling assist in a power steering system, comprising:
   determining a rate of movement of a steering input over a period of time;
   determining a rate of vehicle speed over the period of time;
   controlling an electric power steering assist actuator as a function of one or one or both of the rate of movement of the steering input and the rate of vehicle speed, wherein the rate of movement of the steering input is determined using a higher number of output signals from a steering angle sensor when one or both the rate of vehicle speed is lower and the rate of movement of the steering input is lower, than when one or both of the rate of vehicle speed is greater and the rate of movement of the steering input is greater, wherein the steering angle sensor has an output cycle between 2 milliseconds and 30 milliseconds and wherein multiple outputs from the steering angle sensor are used to determine the rate of movement of the steering input, wherein the rate of movement of the steering input is determined with a smoothing method that is different when one or both of the rate of vehicle speed is lower and the rate of movement of the steering input is lower, than when one or both of the rate of vehicle speed is higher and the rate of movement of the steering input is higher, and wherein the number of steering angle sensor responses used to determine the rate of movement of the steering input at a given vehicle speed and a given rate of movement of the steering input is determined with a smoothing method includes exponential or linear decay or step function smoothing.

10. A method of controlling assist in a power steering system, comprising:
    determining with a steering angle sensor a first rate of movement of a steering input over a first period of time by comparison of two or more outputs of the steering angle sensor that occur in the first period of time;
    determining a vehicle speed in the first period of time;
    determining a second period of time including multiple outputs of the steering angle sensor over which a second rate of movement of the steering input is to be determined based on the multiple outputs of the steering angle sensor that occur in the second period of time, wherein the second period of time is determined as a function of one or both of the first rate and the vehicle speed; and
    actuating a power steering assist actuator that assists movement of the steering input so that the steering input may be moved with less manual effort, wherein the actuation of the power steering assist actuator varies as a function of the second rate of movement of the steering input, and wherein the second period of time is longer when one or both of the vehicle speed is lower and the rate of movement of the steering input is lower, and the second period of time is shorter when one or both of the vehicle speed is higher and the rate of movement of the steering input is higher.

11. The method of claim 10 wherein the second period of time relates to a selected number of consecutive outputs from a digital steering angle sensor, where inclusion of more outputs results in a longer period of time than does inclusion of fewer outputs.

12. The method of claim 11 wherein the first rate of movement of the steering input is determined with a digital steering angle sensor which has an output cycle between 2 milliseconds and 30 milliseconds and wherein multiple outputs from the steering angle sensor are used to determine the first rate of movement of the steering input.

13. The method of claim 11 wherein the second rate of movement of the steering input is determined with multiple outputs from a digital steering angle sensor using a smoothing method that is different when one or both of the vehicle speed is lower and the first rate of movement of the steering input is lower, than when one or both of the vehicle speed is higher and the first rate of movement of the steering input is higher.

14. The method of claim 11 wherein the second period of time and the corresponding number of outputs used to determine the second rate of movement of the steering input at a given vehicle speed and a given first rate of movement of the steering input is determined with a smoothing method includes exponential or linear decay or step function smoothing.

15. The method of claim 11 wherein the number of outputs used to determine the rate of movement of the steering input at a given vehicle speed and a given first rate of movement of the steering input-is determined with a stored data set.

16. The method of claim 10 wherein the electric power steering assist actuator is a pump that pumps hydraulic fluid and the pump is operated to control the level of steering assist provided.

17. The method of claim 10 wherein the electric power steering assist actuator is an electric motor that directly provides steering assist to reduce the effort needed to manually move the steering input.

* * * * *